Jan. 23, 1951 R. W. HARRIS 2,539,076
IRRIGATION CONTROL VALVE
Filed Dec. 14, 1946 2 Sheets-Sheet 1
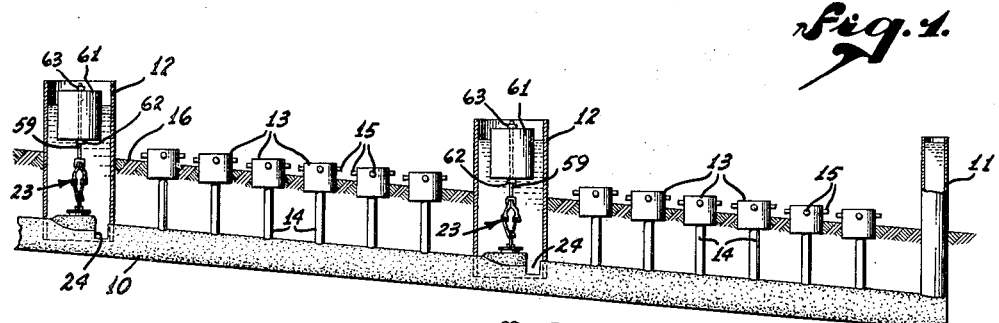
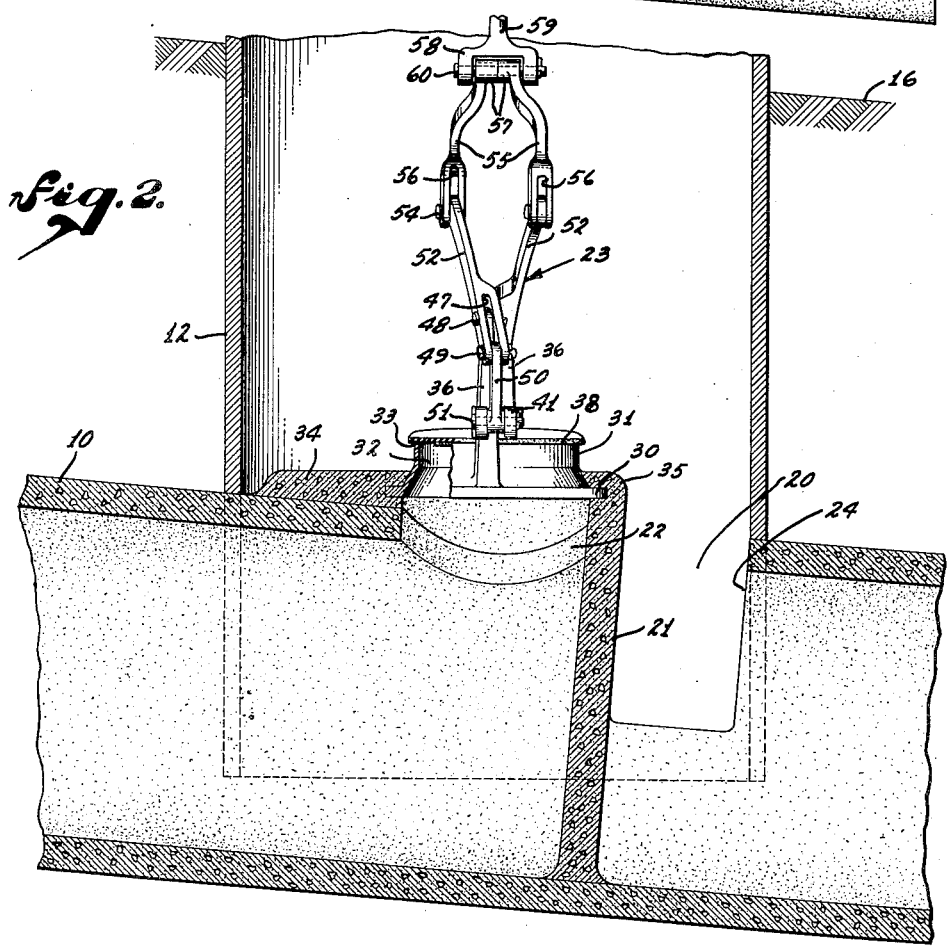
INVENTOR:
ROY W. HARRIS.
BY
ATTORNEYS.

Jan. 23, 1951  R. W. HARRIS  2,539,076
IRRIGATION CONTROL VALVE
Filed Dec. 14, 1946  2 Sheets-Sheet 2

INVENTOR:
ROY W. HARRIS.
BY Huebner, Beehler
and Worrel
ATTORNEYS

Patented Jan. 23, 1951

2,539,076

UNITED STATES PATENT OFFICE 2,539,076

IRRIGATION CONTROL VALVE

Roy W. Harris, Covina, Calif.

Application December 14, 1946, Serial No. 716,367

11 Claims. (Cl. 251—41)

The invention relates to the science of irrigation and has particular reference to irrigation systems which are adapted to supply irrigation water through a system of pipes where the water is carried under pressure.

Irrigation systems, except those employing open trenches, customarily utilize for piping and conduit a variety of concrete piping particularly because of its relative cheapness as compared with metal piping. Irrigation systems must be capable of passing large quantities of water in a relatively short time. Consequently, the capacity of the piping systems must be large, and for this reason the relatively low cost of concrete piping is an important consideration.

Although concrete piping serves the purpose satisfactorily, in most instances it has a limitation which must regularly be taken into consideration, namely, its incapacity to withstand high pressures. It might also be said that concrete piping, because of the nature of the concrete material, is not capable of sustaining any great amount of water hammer.

In regions where irrigation is to be carried out on hillsides the supply of irrigation water is frequently under a considerable pressure head. In order to be able to utilize water under a high head of pressure and still retain the benefit of concrete piping, resort has been had in the past to stand pipes provided with slide gates for the purpose of breaking up the flow of water into units wherein each unit is under a head of pressure no greater than that capable of being handled by the concrete piping system without danger of damage. Some systems have utilized overflow stand pipes in combination with gate valves.

Whether the scheme of operation features gate controlled stand pipes or overflow stand pipes, operation requires water to pass the section devoted to one system of hydrant pots to the next lower system of hydrant pots in accordance with control of the gate valves. From the lowermost system excess water will pass to waste. In either of these systems the stand pipe gates require frequent attention, as do also valves in the hydrant pots and the slide gates at the hydrant pot outlets.

Unless all gates, valves and slide gates are constantly regulated, the stand pipes on the downhill end, particularly, are likely to overflow to a considerable extent, and large quantities of water may be wasted. Water spilling over the tops of the stand pipes, in many instances, may wash away a very substantial amount of fertile soil and create a considerable amount of damage before a proper adjustment can be made.

To circumvent these and other objections to present practices it is, therefore, among the objects of the invention to provide an automatic valve to eliminate all manual control at stand pipes between sections of lines, and also to provide a new and improved positive acting, slow closing irrigation control valve wherein there is sufficient controlled retardation of the rate of valve movement at the final closing stage to substantially eliminate the possibility of water hammer.

Another object is to prevent water waste by reason of spilling over at stand pipes when changes are made at the hydrant outlets to vary the rate of flow.

Another object of the invention is to provide a new and improved irrigation control valve which is adapted to be float operated and wherein there is a sufficient amount of mechanical advantage in the operating mechanism to permit the valve to be operated under relatively heavy heads of water by use of a float of substantially minimum buoyancy.

A further object of the invention is to provide a new and improved irrigation control valve, compact in its arrangement of parts, in which the operating mechanism comprising a system of levers and a connected float is designed to occupy substantially a minimum amount of space so that the valve can be installed in a relatively low stand pipe having a size very little greater than is necessary for the conventional type of hand operated slide gate.

Still another object of the invention is to provide a new and improved irrigation control valve wherein the operating mechanism is sufficiently clear of the valve orifice and of a nature sufficiently simple to enable the valve to continue in operation even though it may be encumbered from time to time by an accumulation of debris.

Still further among the objects of the invention is to provide a new and improved irrigation control valve adapted to be installed in an irrigation system which is sufficiently positive in its action to secure a definite shut-off of water supply by operation of a float of relatively small dimensions confined within a stand pipe of correspondingly small dimensions, the system being one greatly facilitating operation with a minimum amount of attention given to individual hydrant pots, enabling the utilization of low stand pipes relatively small in diameter and, moreover, providing a system including valves and piping which is as effective under low pressure heads as under high pressure heads.

With these and other objects in view, the invention consists in the construction, arrangement and combination of the various parts of the device whereby the objects contemplated are attained, as hereinafter set forth, pointed out in the appended claims and illustrated in the accompanying drawings.

Figure 1 is a schematic representation of an irrigation system incorporating float control valves.

Figure 2 is a fragmentary, longitudinal, sectional view of a control valve in place in a stand pipe, drawn to a larger scale.

Figure 3:
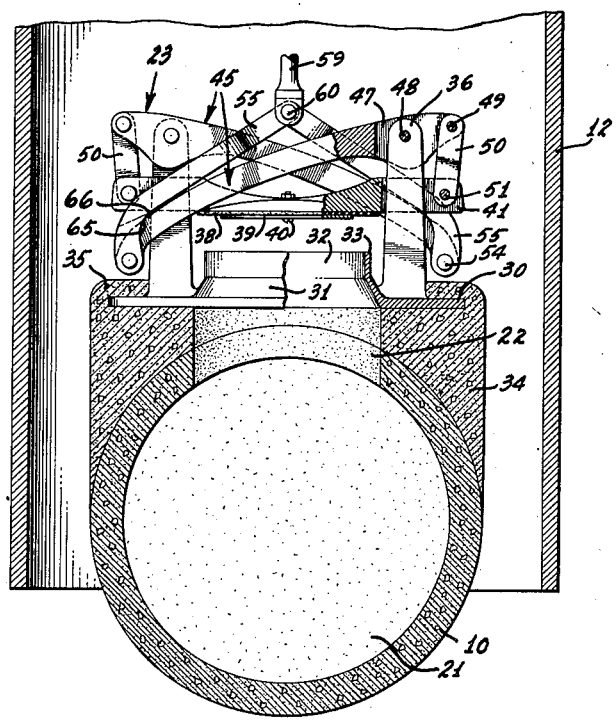
Figure 3 is a cross-sectional view of the valve located in a stand pipe showing the valve in open position.

In areas where fields and orchards are to be irrigated the cost of water is sufficiently important so that water must not be needlessly wasted. Not only is the cost of water wasted which renders such operations uneconomical but also the fact that water wasting away is prone to wash away with it fertile top soil necessary for proper growing conditions in the irrigation area.

Another consideration of great importance is the fact that many irrigated areas are on hillsides, the tendency being toward increasing hillside acreage especially where level acreage has already been exploited and also to provide acreage in more elevated frostless regions where valuable crops can be grown. Hillside acreage usually involves use of water for irrigation purposes which flows to the irrigation system under a very considerable water head. Not only is it necessary to break up the head of water which is usually too great to be handled by concrete piping systems but also to properly distribute the water over the irrigated area. For irrigation to be thoroughly effective hydrant pots placed at upper ends of the furrows in an orchard or irrigated area must be capable of adjustment so that an amount of water flows from them which is neither too little to provide sufficient moisture for the growing crops or trees nor so great as to cause a wash in the furrows or perhaps irregular irrigation wherein one portion of the area receives too great an amount of water and another portion an insufficient amount of water.

In view of the increasing difficulty in securing competent labor in fruit growing and other irrigated regions the problem of irrigation with water supplied under pressure has become increasingly difficult. Proper control of conditions in an irrigation system using stand pipes with manually operated gates requires the careful attention of a large number of experienced individuals. On occasions where sufficient personnel is not available these systems frequently cannot be operated satisfactorily.

Still another factor lies in the fact that in some districts irrigation water must be used when conditions make it available and the system operated continuously throughout the day and night. Unless the system is one which is substantially automatic, operation cannot be satisfactorily continued through the night due to the physical inability of operators to adequately attend to all of the hydrant pots as well as gates in the main line.

To operate a system with substantially a minimum amount of labor requires not only that the system be carefully valve controlled but also that the valves be of such a positive acting nature that they can be depended upon for sensitive, automatic control even though given infrequent attention. Automatic control is especially necessary where water flows under the high pressures since damage and waste resulting from improper control is greatly accelerated.

An irrigation system has been illustrated diagrammatically in Figure 1. This system features operation on a hillside and presumes a supply of irrigation water from a diversion stand which may, on occasions, be under a considerable head of pressure. Although a relatively flat grade has been illustrated, the system is effective for grades of vastly greater slope.

In the illustration a pipe line 10, or lateral, usually made of concrete, is shown laid on a grade sloping downwardly from left to right more or less parallel with the ground surface 16. The lateral terminates at its lower end in a vent pipe 11 and is provided throughout its length with a series of stand pipes 12 only two of which are shown in Figure 1 for the purpose of illustration.

Between each pair of stand pipes is a system of hydrant pots 13 connected to the lateral by means of hydrant pipe lines or risers 14. The number and spacing of hydrant pots will depend to some extent upon the ground condition, the type of orchard or planting to be irrigated, steepness of the slope, character of the ground and other factors well known in the art of irrigation. Each of the hydrant pots is provided with a number of outlets 15 in which may be located slide gates and central screw down valves, not shown, but of a conventional type.

Figure 4:
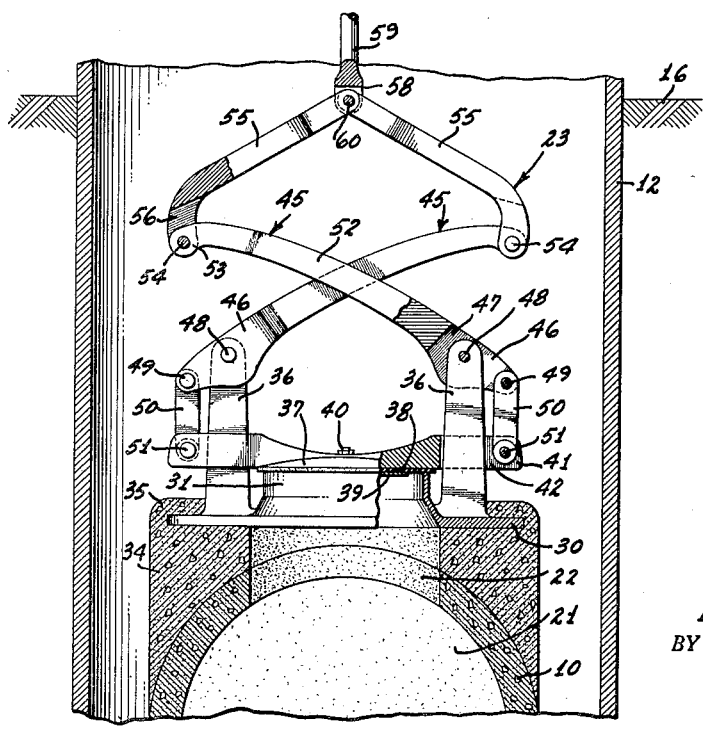
Figure 4 is a longitudinal, sectional view of the valve located in a stand pipe showing the valve in closed position.

In Figures 2, 3 and 4 are illustrated details of the specific type valve comprising the subject matter of the invention described herein.

The lateral pipe line 10 is shown broken at the area 20 and the stand pipe 12 is shown straddling the broken area. A plug 21 is set transversely to the lateral and divides the broken area 20. On one side of the plug is an aperture 22 through which water flows upwardly into contact with the control valve device indicated generally by the reference character 23. After passing the control valve device water enters the interior of the stand pipe and, depending upon conditions at an elevation lower than the stand pipe, flows downwardly through a passage defined by an aperture 24 and thence downwardly through the lateral in the direction of either the next lower stand pipe or the vent at the end of the line.

As perhaps best shown in Figure 2, the valve device consists of a flanged base 30 including a body portion 31 providing an orifice or valve opening 32 at the top of which is a valve seat 33. The flanged base 30 is adapted to be mounted upon a concrete foundation or footing 34 and locked in place by an overlying portion 35 of concrete. The valve may be set upon the concrete footing at the same time that the plug 21 is placed in the lateral.

Upon the flanged base are provided upwardly extending guide posts 36, two in number, spaced laterally a short distance away from the valve seat 33. The guide posts extend upwardly a substantial distance above both the flanged base and the valve seat and are offset with respect to each other and the center of the valve.

For closing the valve orifice there is provided a disc valve 37 adapted to overlie the valve seat and to be moved toward and away from a seating position in order to appropriately seal the valve. When the valve element is in closed position there is provided a gasket 38 of rubber-like or other sealing material held in place by a washer 39 anchored in place by means of a bolt 40.

At the sides of the valve element are ears or extensions 41, two in number; one being provided for each of the guide posts 36. The extensions have recesses 42 cut into them in order to permit the extensions to slide freely up and down with relation to the guide posts. For moving and controlling operation of the valve element there is provided a lever system or mechanism located immediately above the flanged base and designed with a view toward confining movement of the mechanism to a space little wider than the maximum width of the flanged base. The offset relationship of the posts allows the levers to pass each other freely within the limited space provided. The compact design of the lever system enables the valve device to operate within a stand pipe of relatively small internal diameter without, however, sacrificing the mechanical advantage necessary to effect a powerful closing movement of the valve. The full lengths of the levers, pivoted as they are on opposite sides of the valve, makes a high mechanical advantage possible.

The leverage system consists of twin members pivoted at their respective ends. Arcuate arms 45 are shown comprising the members, each having an enlarged end 46 milled or otherwise slotted to form a recess or forked formation 47 adapted to fit over the upper end of the respective guide post 36. A pivot pin 48 pivotally secures the arcuate arm to the top of the guide post. The forked end of the arcuate arm may be described as relatively short in that its effective length terminates at a point wherein a pivot pin 49 connects the arm to a link 50. At its other end the link is connected by means of a pivot pin 51 to the extension 41 of the valve element.

On the opposite side of the pivot pin 48 the arcuate arm has a long end 52 which terminates in a turned-over tip 53 pivotally connected by means of a pivot pin 54 to one arm of a second pair of arms 55. Curvature of the arms 45 has a tendency to preserve the advantageous leverage as the arms are elevated to valve closing position. Each arm 55 is provided with a slot 56, the sides of which surround the turned down portion 53, thereby increasing the stability of the linkage. Each of the arms 55 has a boss 57 at the upper end retained pivotally within a recessed fitting 58 on a float rod 59 by means of a pin 60. At the upper end of the float rod a buoyant float 61 having an axial tube 62 surrounding the rod is attached thereto by means of a collar and set screw 63. The float, usually of metal, is adapted to slide freely up and down within the stand pipe, there being provided a sufficient amount of clearance so that the float can always find its own level whenever water rises in the stand pipe. The very flexible character of the leverage also permits the float to center itself without the valve being cocked or tilted.

In operation, whenever water is admitted to the lateral 10 from a diversion stand or supply line higher up on the slope, water flows through the lateral to the lower end where it enters the vent pipe 11. As water begins to rise in the vent pipe it also extends upwardly in the risers 14 to the hydrant pots 13 from which, when the valve therein is opened, it flows outwardly through the outlets 15 and from the outlets into the furrows.

Water will start flowing first from the lowermost hydrant pot below the lowermost stand pipe 12, but as water continues to rise in the vent pipe 11, water will rise likewise in the risers 14 higher up the slope until water is flowing from all of the hydrant pots between the vent pipe 11 and the lowermost stand pipe 12. During flow of the water from the lower system of hydrant pots proper adjustments at the pots are made by hand so that the right amount of water flows from all of the hydrant pots.

Adjustment may also be necessary to make certain that there is adequate flow from all the hydrant pots in the lowermost system. The adjustment will, of course, have to take into consideration the quantity of flow available.

After a system has been in operation and the proper flow of water for each hydrant pot adjusted, these settings may be left more or less permanent, subject only to minor regulation as conditions change from time to time. After there has been sufficient flow from the lowermost system, hydrant valves may be closed to shut off the system below the lowermost stand pipe 12, and water will then begin to rise in the lowermost stand pipe. When it reaches a sufficient level to lift the float 61 to its uppermost position, the corresponding valve device will occupy the closed position illustrated in Figure 4. On occasion, however, the lower valve may close only partly and the next higher valve open partly for irrigating at two levels at the same time. A balance is thus maintained automatically by operation of the float valves. Valve operation will be automatically coordinated all along the line as conditions change. Moreover, if the pressure in the lateral should vary upwardly or downwardly, the flow from the hydrant pots is maintained constant because of the flow control exercised by the float valve.

An important feature in the valve closing mechanism is the extremely great power exerted by the mechanism during the final fraction of an inch of closing movement just before the valve disc is sealed upon the seat. By reason of the selected length and arrangement of the arcuate arms 45 and the secondary pair of arms 55, the effective lever arm length on one side of the pivot pins 48 is very much greater than the effective lever arm length of the short ends of the arcuate arms 45. This in itself provides a very considerable mechanical advantage.

An additional factor, however, promotes a very gradual final closing movement which is an important phase of valve operation. It will be noted that the pivot pins 48, 49 and 51 are grouped in a somewhat triangular relationship. During the final closing movement the pivot pin 59, traveling in an arc about the pivot pin 48, approaches an imaginary line extending between the pivot pins 48 and 51. As the distance between the pivot pin 49 and the imaginary line shortens by reason of lifting of the float, the rate of shortening of the distance may be said to accelerate. As rapidly as said distance shortens the effective lever length on the corresponding side of the pivot pin 48 likewise shortens, thereby altering the whole leverage ratio so that only a relatively light lift on the float produces a very considerably increased, powerful, downward movement upon the valve element against the flow of water through the orifice. Following well-known mechanical principles the increase in power of closing is accompanied by a marked decrease in the speed of movement of the valve, The closing, therefore, is very slow and, due to the accompanying force, is under very careful control. Action of this kind prevents an abrupt closing of the valve orifice, thereby preventing surges of water of high pressure in the pipes, eliminating water hammer and avoiding the attendant vibration or surge of pressure which, if present, would have a tendency to damage or crack the concrete pipe line comprising the lateral.

Following closure of the valve device in the lowermost stand pipe 12, water will begin to flow in the risers 14 on the high side of the lowermost stand pipe until all of the hydrant pots between the two stand pipes 12 illustrated in Figure 1 are flowing. Given sufficient flow of water, irrigation will continue from the hydrant pots in stages from the low end of the system toward the high end of the system.

Other circumstances, such as an unexpected increase in flow or too great a restriction to the flow of the lower hydrant pots, may bring the valve devices into operation. This, in turn, will cause a rise of water in the lowermost stand pipe and a consequent lifting of the float and closure of the corresponding valve device. With the closing of the lowermost valve device water is confined to the system and none need be washed. An increase in amount of water causes water to rise higher in the line to the higher outlets without the need of manual control.

On other occasions, it may become advisable to close the valve devices by hand, and the construction is one which readily permits manual closing through use, for example, of a chain or extension on the float rod.

When water ceases to flow into the lateral or under circumstances where water flows from the hydrant pots at a rate faster than that necessary to cause a rise in the water level within the stand pipes, the floats will lower and the valves will open.

In open position the linkage and the valve element occupy the positions shown in Figure 3. It will be noted that there is ample clearance around the orifice 32 and valve seat 33 so that the full volume of water passing the orifice can readily pass outwardly from the valve, there being no obstructions close to the orifice outlet.

In open position, also, the linkage is nested compactly around and above the valve element. The compactness of the arrangement in open position is due in part to the provision of a curved area 65 at the lower end of each of the secondary arms 55 where they adjoin the upper ends of the arcuate arms 45. It is significant that the upper faces of the adjacent ends of the arms 45 are curved as at 66 in a complementary fashion so as to abut the adjoining lower faces of the secondary arms 55 over a considerable portion of their contiguous faces. By providing an arrangement such as this, the float rod 59 may be kept relatively short and this, in turn, makes it possible to keep the float low and the height of the stand pipes 12 at a minimum.

In practice, it has been found also that by reason of the compact arrangement of the leverage, confined as it is to a lateral dimension little greater than the width of the valve base 30, irrigation control valves of a 5" capacity can be used in stand pipes having a diameter of no greater than 16" and the entire mechanism operated by use of a 3 gallon float. A 5" valve has been found to be capable of passing an ample amount of water for practically all requirements in systems of this kind but making it possible to utilize a stand pipe of only 16" in diameter in contrast to stand pipes of 20" to 36" used in the case of float valves of less compact design. A great amount of space is thereby saved in the orchard around the trees. Small low stand pipes greatly increase freedom in cultivation around the trees and the pipes; whereas, stand pipes 36" in diameter, for example, provide a definite objectionable obstruction in the orchard.

Removal of the pivot pins 48 allows the entire leverage and the valve to be removed as a unit from its position on the posts 36 for servicing and repair. The offset effect of the posts 36 with respect to the center of the valve increases the freedom of movement of the lever system attached thereto.

The construction and arrangement of the valve device herein described is one of particular simplicity in that many of the parts are duplicated for opposite sides of the device, the number of moving parts are relatively few, and as a result of the inherent features of the design, the valve device can be built rugged so that the operations continue under adverse conditions and the valve is made capable of resisting a considerable amount of abuse. Because of its construction the valve will close tightly after being permitted to remain open over long periods of time, and the system once adjusted in the field is capable of a nearly automatic operation whenever water is diverted into the laterals.

The valve is of such a compact construction that it can be readily substituted for valves in existing systems wherein stand pipes of small diameter are already in place. The valve will function with such effectiveness as to permit efficient operation of the hydrant pots without material change in the valve setting therein other than occasional adjustment of the slide gates. By reason of its uniformity of operation under all conditions the valve without change may be installed and operated effectively under both high and low pressures. In high pressure systems use of the valves has the overall effect of reducing the pressure to that of a low pressure system.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

Having described my invention, what I claim as new and desire to secure by Letters Patent is:

1. A valve operating mechanism comprising a pair of guide posts, valve carrying extensions in sliding relationship with said guide posts, and operating linkage for the valve carrying extensions pivoted to said guide posts and to the extensions on the side of said guide posts opposite from the side of said extensions adapted to engage the valve element.

2. An irrigation control valve operating mechanism comprising a base having guiding portions, a valve carrying extension including a portion slidably engaging said guiding portions of said base, a system of levers adapted to lift and lower said extension to respective open and closed positions, said systems comprising at least one arm with a pivoted connection to the base having a long end overlying the portion of the extension on one side of a guiding portion of the base and a short end directed outwardly from the pivot connection on the other side of said guiding portion, a link pivoted to the short arm end and to the extension, and a secondary arm for said first described arm pivoted to the long end of the first arm.

3. An irrigation control valve operating mechanism comprising a base, a valve carrying extension means overlying said base, a pair of upwardly extending guides disposed on the base at the sides thereof, said extensions being guided by said guides, a system of levers adapted to lift and lower said extension to respective open and closed positions, said system comprising a set of arms, each pivoted near the top of one of said guides having a long end at the side of the guide overlying the extension between said guides, and a short end at the outer side of the guide, a link pivoted to each short end and to the respective extension outwardly of the guides, and a set of secondary arms pivoted to the long ends of the first arms.

4. An irrigation control valve operating mechanism comprising a base, a pair of upwardly extending guides disposed on the base at the sides thereof, a valve carrier having extensions thereon slidably engaging said guides, a system of levers adapted to lift and lower said carrier to respective open and closed positions, said system comprising a pair of arms, each pivoted near the top of one of said guides having a long end at the side of the guide overlying the carrier between said guides and a short end at the other side of the guide, a link pivoted to each short end and to the respective extension of the carrier on said other side of the guide, a pair of secondary arms pivoted to the long ends of the first arms and a pivotal junction at the ends of the secondary arms remote from connections thereof to the first arms.

5. An irrigation control valve operating mechanism comprising a valve carrier, a body, guide means extending outwardly from the body and adapted to slidably engage portions of said carrier, a pair of arms engaging respective guides at pivot points and having relatively long ends disposed in crossed relationship and having relatively short outwardly extending ends, links having pivot connections to the short ends and adapted to engage adjacent portions of the carrier outwardly of the guide means, said pivot connections between links and the short ends having locations above the pivot points in their upper position and in their lower position having locations below the pivot points and arcuately inward from the upper position thereof, and a second pair of arms pivotally secured to the long ends of the respective arms of the first pair.

6. An irrigation control valve operating mechanism comprising a valve carrier, a body having a portion adapted to slidably engage portions of said carrier, a pair of upwardly bowed arms engaging the body at respective pivot points and having relatively long ends disposed in spaced crossed relationship and having relatively short outwardly extending ends, links having pivot connections to said short ends and adjacent portions of the carrier outwardly of said pivot points, and a second pair of arms having downwardly curved ends pivotally secured to the long ends of the respective arms of the first pair, said curved ends having a nested position adapted to overlie the adjacent ends of said first arms throughout a substantial portion of their length.

7. An irrigation control valve operating mechanism comprising a valve carrier, a body, guide means extending outwardly from the body and slidably engaging said carrier, an arcuate arm having a relatively long end extending over the carrier inwardly of said guide means and having a relatively short forked end engaging the guide means at a pivot point and extending outwardly thereof, a link having a pivot connection to the forked end and an adjacent portion of the carrier outwardly of the pivot point, said pivot connection between the link and the forked end having a location above the pivot point in one position and below the pivot point and arcuately inward from initial position thereof in another position, and a second arm having a downwardly curved partially forked end pivotally secured to the long end of the first arm, said curved end having a nested position adapted to overlie the adjacent end of said first arm throughout a substantial portion of its length.

8. An irrigation control valve operating mechanism comprising a valve carrier, a body, guides at the sides of the body extending outwardly therefrom and slidably engaging laterally outwardly extending portions of said carrier, a pair of upwardly bowed arms having relatively long ends disposed in crossed relationship over the carrier between said guides and having relatively short forked ends engaging respective guides at pivot points and extending outwardly thereof, links adapted to connect pivotally to the forked ends and to adjacent outwardly extending portions of the carrier outwardly of said pivot points, said pivot connections between links and the forked ends having locations above the pivot points in open position and below the pivot points and arcuately inward from initial position thereof in final closing position, and a second pair of arms having downwardly curved, partially forked ends pivotally secured to the long ends of the respective arms of the first pair, said curved ends having a nested position adapted to overlie the adjacent ends of said first arms throughout a substantial portion of the length, and pivotal means for joining free ends of said second pair of arms.

9. An irrigation control valve operating mechanism comprising a valve carrier, a body, an operating linkage comprising a guide means extending outwardly from the body and adapted to slidably engage portions of said carrier, a pair of arms having relatively long ends disposed in crossed relationship outwardly of the carrier and having relatively short ends engaging the guide means at pivot points and extending laterally outwardly thereof, links having pivot connections to the ends of said arms and adapted to pivotally engage adjacent portions of the carrier, said pivot connections and pivot points forming corners of a triangular pattern on each side of the carrier, said pivot connections between links and the short ends having locations spaced from a line connecting remaining corners of the triangular pattern a distance greater in open position of the carrier than in closed position, a second pair of arms connected at one end thereof respectively to the first pair of arms and a pivotal connection at the other end of said second pair of arms.

10. An irrigation control valve operating mechanism comprising a valve carrier, a body, a linkage comprising guide means extending outwardly from the body and adapted to slidably engage portions of said carrier, a pair of arms having relatively long ends disposed in crossed relationship above the carrier and having relatively short ends engaging the guide means at pivot points and extending outwardly thereof, and links having pivot connections to the short ends and adapted to pivotally engage adjacent portions of the carrier outwardly of said pivot points, said pivot connections and pivot points forming corners of a triangular pattern on each side of the carrier, said pivot connections between links and the short ends having locations spaced from a line connecting remaining corners of the triangular pattern a distance greater in open position than in closed position.

11. An irrigation control valve operating mechanism comprising a valve carrier, a body, a linkage comprising guide means extending outwardly from the body and adapted to slidably engage portions of said carrier, a pair of outwardly bowed arms having relatively long ends disposed in crossed relationship above the carrier and having relatively short ends engaging the guide means at pivot points and extending outwardly thereof, links having pivot connections to the short ends and adapted to pivotally engage adjacent outwardly extending portions of the carrier outwardly of said pivot points, said pivot connections between links and the short ends having locations outwardly of the pivot points in open position and inwardly therefrom and arcuately inward from initial position thereof in final closing position, said pivot connections and pivot points forming corners of a triangular pattern on each side of the carrier, said pivot connections between links and the forked ends having locations spaced from a line connecting remaining corners of the triangular patterns a distance greater in open position than in closed position, a second pair of arms connected respectively to the first pair of arms and a pivotal connection between said second pair of arms.

ROY W. HARRIS.

REFERENCES CITED

The following references are of record in the file of this patent:

UNITED STATES PATENTS

| Number | Name | Date |
|---|---|---|
| 27,040 | Douglas | Feb. 7, 1860 |
| 1,007,191 | Foley | Oct. 31, 1911 |
| 1,064,386 | Schuh | June 10, 1913 |
| 2,098,131 | Bluhm | Nov. 2, 1937 |